UNITED STATES PATENT OFFICE.

HENRY B. BLACKWELL, OF BOSTON, MASSACHUSETTS.

IMPROVEMENT IN SACCHARINE-COMPOSITION SIRUP.

Specification forming part of Letters Patent No. 187,747, dated February 27, 1877; application filed April 13, 1876.

*To all whom it may concern:*

Be it known that I, HENRY B. BLACKWELL, of Boston, of the county of Suffolk and State of Massachusetts, have invented a new and useful Saccharine Composition; and do hereby declare the same to be fully described, as follows:

It is composed of uncrystallized or uncrystallizable, or not readily crystallized, glucose, sucrose, and water, and is a sirup for table or culinary uses.

By the combination of glucose and sucrose in solution, a sirup is produced which, in flavor, permanence, sweetness, and consistency, is superior in quality to a solution of glucose, or, in many respects, to a solution of sucrose, alone, and becomes fitted for uses for which glucose cannot be employed to so good advantage. It forms a cheap substitute for the sirup of common cane-sugar, and, in fact, is an artificial imitation of the molasses and sirups derived from sugar-cane, maple, or beet.

In making the composition I usually take three parts, by measure, of the glucose, one part, by measure, of the sucrose, and also water sufficient to dissolve them, and form with them a sirup of the requisite consistency; also using or employing, if necessary, heat to aid or facilitate the dissolution and combining of the glucose and sucrose.

I am aware that it is not new to manufacture crystallizable sugar by the admixture of glucose and sucrose, and I do not claim such as my invention, my composition differing therefrom by employing glucose in the form of an uncrystallizable sirup, or of a sirup not readily crystallizable. My invention also differs in the form of the product, the same being a sirup.

I claim as my invention—

The described artificial saccharine sirup or composition, consisting of glucose in the form of an uncrystallized or an uncrystallizable sirup, or of a sirup not readily crystallized, sucrose, and water, combined in or about in the proportions as specified.

HENRY B. BLACKWELL.

Witnesses:
R. H. EDDY,
J. R. SNOW.